Feb. 9, 1943.  B. NOBLE  2,310,592
BATCH CHARGER
Filed March 29, 1941  3 Sheets-Sheet 1
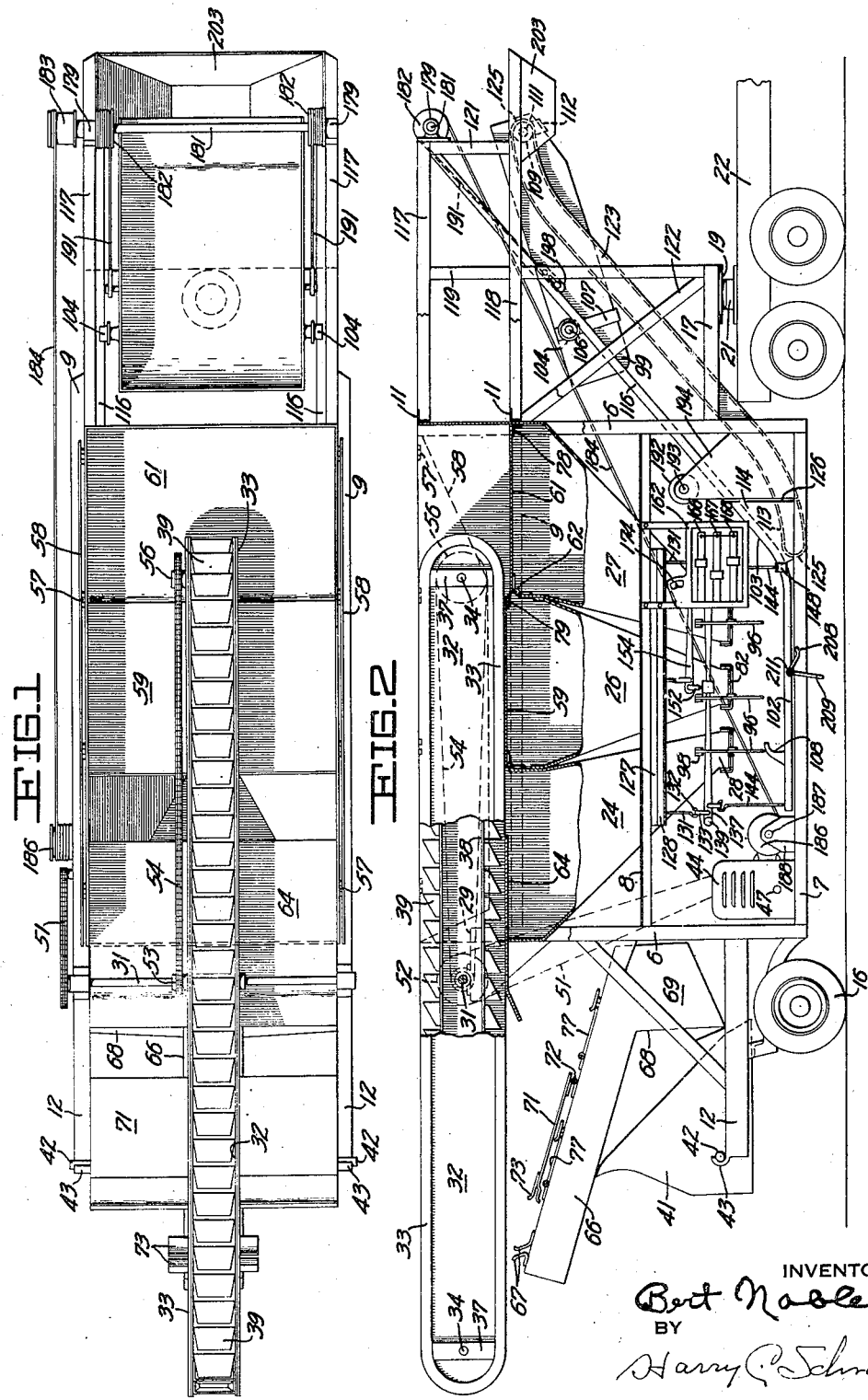
INVENTOR
Bert Noble
BY
Harry C. Schroeder Feb. 9, 1943.   B. NOBLE   2,310,592
BATCH CHARGER
Filed March 29, 1941   3 Sheets-Sheet 2

FIG.3

INVENTOR
Bert Noble
BY
Harry C. Schroeder

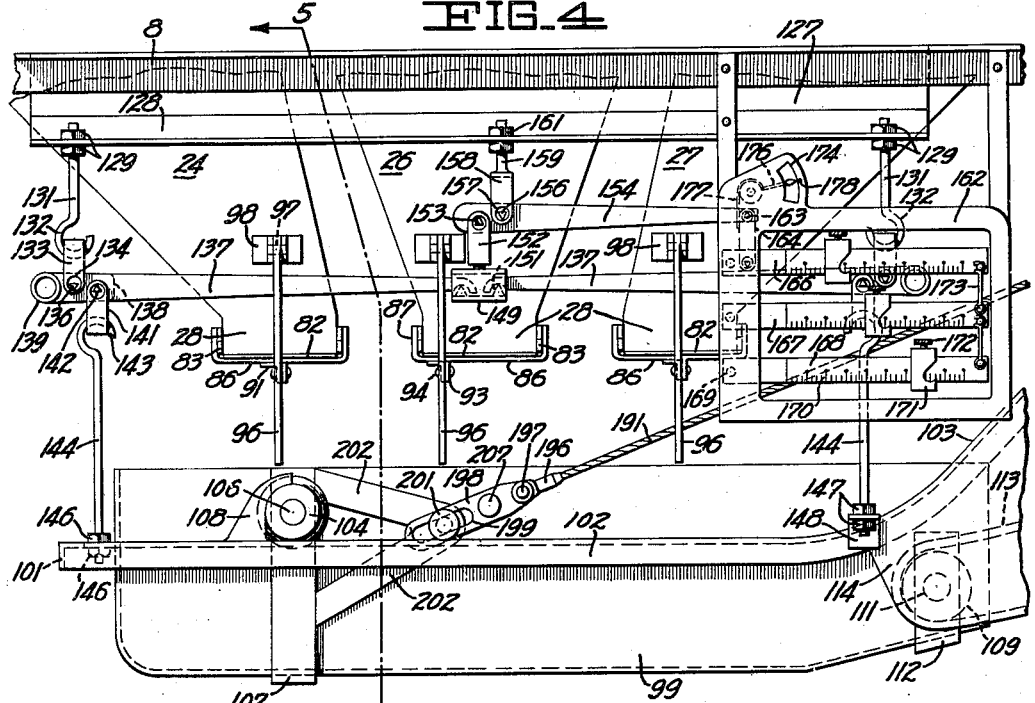
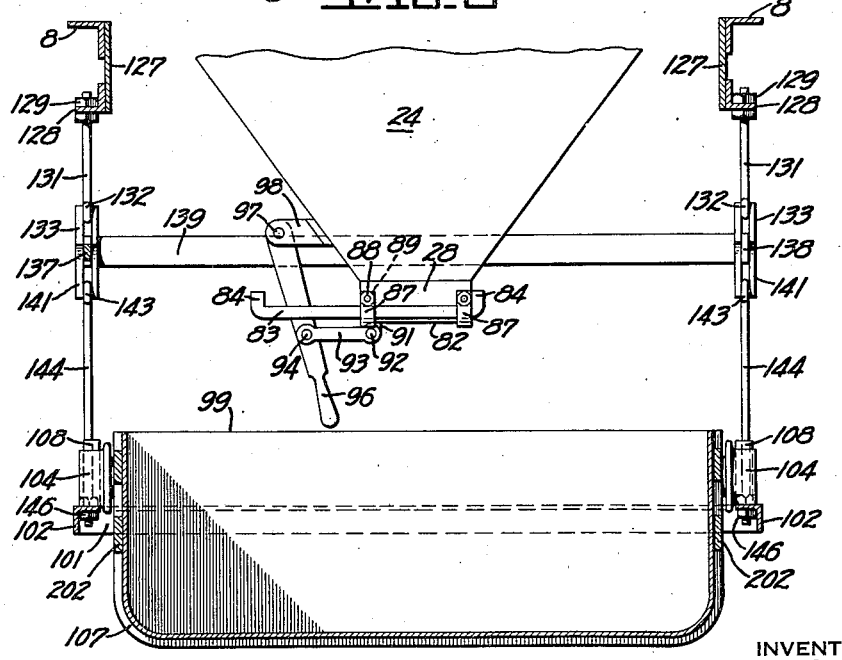

Patented Feb. 9, 1943

2,310,592

UNITED STATES PATENT OFFICE 2,310,592

BATCH CHARGER

Bert Noble, Oakland, Calif.

Application March 29, 1941, Serial No. 385,845

13 Claims. (Cl. 214—2)

This invention relates to mechanisms for handling and apportioning the several ingredients of a mixture such as concrete.

It is an object of the invention to provide a readily portable storage hopper, weighing mechanism and loading device, which may be advanced as the work progresses so as to maintain the source of the raw materials economically close to the place of use.

Another object of the invention is to provide a mechanism of the character described in which superstructural parts may be readily folded and collapsed so as to sufficiently reduce the overall height of the device sufficiently to permit its passage along thoroughfares having overhead trolley or domestic electric service lines.

A further object of the invention is to provide, in a mechanism of the class described, a novel arrangement in which the skip, for transporting measured quantities of ingredients from a storage station to a discharge station, functions as an integral portion of a weighing mechanism so that the various ingredients are weighed as they are deposited in the skip.

The invention possesses other objects and features of advantage which, together with the foregoing, will be specifically brought out in the detailed description of the invention hereunto annexed. It is to be understood that the invention is not to be limited to the specific form thereof herein shown and described as various other embodiments thereof may be employed within the scope of the appended claims.

Referring to the drawings:

Figure 1 is a top plan view of the batch charger of my invention.

Figure 2 is a side elevational view of the batch charger showing the latter conditioned for transport.

Figure 3 is a vertical sectional view showing the batch charger conditioned for operation.

Figure 4 is an enlarged fragmental side elevational view showing, particularly, the weighing mechanism.

Figure 5 is a vertical sectional view taken in the plane indicated by the line 5—5 of Figure 4.

Referring to Figure 3, I provide a pair of parallel side frames each composed of vertical corner posts 6 secured together by horizontally extending bars 7, 8 and 9 and by transverse cross members 11. The rear end of the frame is provided with a pair of elevated extension members 12 carrying mountings 13 for an axle 14 upon which ground-engaging wheels 16 are journaled. A pair of frame members 17, attached to the forward corner posts 6 and forming the bottom of an elevator support frame, carries cross members 18 upon which is mounted one section of a trailer hitch 19 which may be attached, as shown in Figure 2, to a mating hitch section 21 mounted on a truck or tractor 22 so that the batch charger may be transported from one scene of operations to another. As shown in Figure 3, the batch charger is detached from the truck or tractor and is set upon support blocks 23 so that the weight of the charger, during operations thereof, in addition to the weight of the material being handled, will not be imposed on the wheels 16.

Means are provided for storing quantities of separate ingredients in the charger and for replenishing the said quantities as portions thereof are removed from storage. Carried by the corner posts 6 and the bars 9 is a plurality, preferably three, of separate hoppers 24, 26 and 27 each having an open top and converging at its bottom to form a constricted discharge spout 28. The hoppers 24, 26 and 27 may contain, respectively, gravel or crushed rock, sand and cement. Journaled on brackets 29 extending rearwardly from the rear corner posts 6, is a pivot shaft 31 upon which is mounted a pair of parallel conveyor side plates 32 each being provided with a stiffening frame 33 and having adjacent each end a transverse shaft 34 each of which carries a pulley 36. The shafts 34 are journaled in bearing plates 37 forming part of the stiffening frame 33. An endless belt 38, tractionally engaging the pulleys 36, has attached thereto a plurality of buckets 39. An open-top three-sided bin 41 having hanger lugs 42, which pivotally engage hooks 43 formed at the ends of the extension members 12, is positioned at the lower end of the conveyor so that material dumped into the bin 41 will be picked up by the conveyor buckets 39 as they pass through the bin and elevated toward the upper end of the conveyor. A motor unit 44, preferably an internal combustion engine, is mounted on a platform 46, provided adjacent the rear end of the lower frame bars 7, and has its drive shaft 47 connected by a chain 48 to drive a jack shaft having a sprocket 49 connected by a primary drive chain 51 with an idler sprocket 52 journaled on the pivot shaft 31. A sprocket 53, secured for rotation with the idler sprocket 52, has a chain 54 engaged therewith which also engages a sprocket 56 secured to the upper transverse shaft 34. Thus the motor or engine 44 is connected to drive the conveyor belt 38 and, by the provision of the hinged drive at the pivot shaft 31, the conveyor may be rocked about the pivot shaft without disturbing or disconnecting any of the drive mechanism.

Each of the vertical side plates of the hoppers has attached, by hinges 57, to the upper edge thereof a vertical flap 58 so that the height of the side plates is extended. Transversely extending bulkhead plates 59 and 61 are pivotally mounted, by hinges 62, on the upper edges of the intermediate hopper walls and are each provided with clips 63 for bolting the bulkhead plates to the flaps 58 so as to maintain the latter and the bulkhead plates in substantially vertical positions. A plate 64, secured to the edges of the conveyor side plates 32, functions as a vertical side for the hopper 24. Positioned above the hoppers is an inclined tubular chute 66 provided adjacent its lower end with spaced clips 67, which straddle the upper edge of the bulkhead plate 61, and having at its upper end an enlarged entrance hopper 68 whose side plates 69 overlap the side plates 32 at the upper end of the conveyor. A flap 71, pivotally connected by means of a hinge 72 to the underside of the chute 66, has a clip 73 secured to its lower end to form a fork straddling and engaging the upper edge of the bulkhead plate 59. The flap 71 thus serves as an. upward continuation of the plate 59. Openings 74 and 76, formed in the bottom of the chute 66, are positioned, respectively, above the open ends of the hoppers 24 and 26 and are each provided with hinged gates 77 the lower portion of each of which is adapted to be swung into a position overlying and closing the chute openings 74 or 76 and, when the lower portion is swung downwardly to uncover the opening, the upper portion being positioned to clock the chute passage. Thus, as shown in Figure 3, the material being carried by the buckets 39 upwardly from the bin 41 will be discharged into the entrance hopper 68 and will flow out of the opening 74 into the hopper 24. Similarly, if the opening 74 is closed and the opening 76 is open, the material will flow along the chute until it reaches the opening 76 whereupon it will discharge into the hopper 26. If both openings 74 and 76 are closed, the material will flow competely through the chute and will discharge from the end thereof into the hopper 27. Thus, by manipulating the gates 77, the material may be directed into any selected one of the hoppers.

The batcher, with the conveyor erected and the chute 66 in place, possesses considerable overall height and therefore I have arranged for the parts to be conveniently folded and collapsed so as to permit transportation of the batcher along thoroughfares where the headroom is limited due to overhead trolley wires or domestic electric power feeder lines. In accomplishing this reduction in height, the chute 66 is first lifted from engagement with the upper edges of the bulkhead plates 59 and 61 and lowered to the ground. The bolts holding the clips 63 are now removed and the plates are swung downwardly about the hinges 62 until the plates are in substantially horizontal positions. An angle iron clip 78 engages the distal edge of the plate 61 so as to hold it in its horizontal position and an extension 79 on the plate 61 serves as a stop for the plate 59. The flaps 58 are now swung downwardly about their hinges 57 to positions overlapping the longitudinal side plates of the hoppers. The conveyor, after the bin 41 has been removed by releasing the pins 42 from engagement with the hooks 43, may be swung about its pivot 31 until the upper end of the conveyor is lowered, as shown in Figure 2, into the well formed at the top of the hoppers by the downward folding of the bulkhead plates 59 and 61. The bin 41 may now be replaced with the pins 42 engaging the mounting hooks 43 and the normally upper end of the bin resting on a cross member 81 forming part of the structure of the extension members 12. The chute 66 may be conveniently placed on top of the bin 41 with the entrance hopper 68 thereof lying on top of the extension members 12. The batcher, after being hitched to the truck or tractor 22 and upon removal of the support blocks 23, is now ready for transportation.

Means is provided for releasing materials from the respective hoppers and means is provided below the hoppers for receiving the discharged materials. As is best shown in Figures 4 and 5, each of the hopper spouts 28 is provided with a gate 82 closing its lower end and with a pair of parallel rails 83 extending horizontally therefrom. Upturned stops 84 are provided at each end of the rails 83. The gates 82 are each provided with straps 86 having upturned ends 87 provided with pins 88 upon which are journaled rollers 89 resting on top of the rails 83, and with an ear 91 bearing a pin 92 to which is pivotally attached one end of a drag link 93. The other end of the drag link 93 is pivotally connected, by means of a pin 94, to a control lever 96 which is pivotally mounted, at its upper end and by a pin 97, on brackets 98 supported by the sides of the hoppers. It will be seen that by pulling or pushing on the control lever 96 the gate 82 may be moved, as the rollers pass along the tracks 83, to uncover or close the lower end of the hopper spout. A skip 99, having an open top and one open end, is positioned below the spout openings so as to receive any materials which are discharged from the hoppers 24, 26 or 27 through the gates 82 thereof.

Means is provided for weighing the material discharged into the skip 99. Extending along and spaced from the opposite longitudinal sides of the skip and tied together at their rearward ends by a cross member 101 are parallel skip rails 102 each having an upwardly curved forward end portion 103. Peripherally flanged rear wheels 104, which are journaled on pins 106 carried by a reinforcing band 107 mounted transversely on and adjacent the rear end of the skip, engage the tops of the skip rails 102 and stops 108, welded or otherwise secured to the rails 102, are engageable by the wheels 104 so as to limit the rearward movement of the skip on the rails and to insure proper positioning of the skip below the delivery spouts 28. A pair of forward wheels 109, journaled on pins 111 carried by a forward reinforcing band 112 secured to the skip are engaged in movable lower sections 113 of channel tracks, the latter sections of the channel tracks being fixedly secured, by gusset plates 114, to the curved end portions 103 of the skip rails. Parallel upper skip rails 116, which are continuations of the curved portions 103 of the skip track, extend angularly upwardly for a considerable distance beyond and above the frame supporting the trailer hitch 19 and are attached to bars 117 extending from the upper edge of the hoppers and to forward extensions 118 of the frame bars 9. Vertical frame bars 119, 121 and diagonal bracing bars 122 stabilize the rails 116 and the hitch mounting 17 and 18. Parallel lower channel rails 123, which are continuations of the movable rail sections 113, also extend angularly upwardly in equidistant relation with and below the skip rails 116. The upper end of each channel rail 123 and also the lower end of each movable rail section 113, is blocked by looped portions 125 of the channel flanges. It will be noted that the lower portions 103 and 113 of the skip track and channel rails are separated from the rising portions of the track and rails, which are fixedly mounted on the batcher frame, by a gap 126. Thus the rails 102, including the rising portions 103 thereof, and the lower portions of the channel rails which, together, form the skip cradle, are free for limited movement vertically with respect to the fixed portions of the skip track.

Secured to the bars 8, by gusset plates 127, and substantially vertically alined above the skip rails 102, are scale support bars 128, secured by nuts 129 to the ends of which are upper hanger rods 131 each being provided, at its lower end, with a hook 132. Supported by each of the hooks 132 is a fulcrum clevis 133 having apertures 134 in its legs in which the knife-edged fulcrum pins 136 carried, respectively, by the front lever arms 137 and the shorter rear lever arms 138 are positioned. Preferably tubular shafts 139 are secured, as by welding, to the lever arms 137 and 138 so that they are secured together for corresponding movement. Additional fulcrum clevises 141, which are hung on knife-edged fulcrum pins 142 provided on the lever arms 137 and 138 and spaced from the pins 136, engage the hooks 143 formed at the upper ends of lower hanger rods 144. One pair of these hanger rods passes through apertures formed in and adjacent the rear ends of the skip rails 102 and are secured thereto by nuts 146. The other pair of hanger rods 144 are secured, by nuts 147, to angle clips 148 secured to the gusset plates 114 adjacent the forward ends of the skip rails. The ends of the longer lever arms 137 enter a fulcrum block 149 and rest therein on knife-edged fulcrum pins 151. A fulcrum clevis 152 is secured to and rises from the fulcrum block 149 and engages fulcrum pins 153 carried by a scale bar 154 which is pivotally mounted, by fulcrum pins 156 engaged in the leg apertures 157 of a clevis 158, on a scale support bar 128, a stud 159, secured by nuts 161, effecting the connection between the scale bar and its relatively fixed support. The end of the scale bar 154 enters a scale frame 162 and is pivotally connected, by pins 163 and a link 164, with the uppermost one of a series of weight beams 166, 167 and 168, which are each pivotally mounted by pins 169, or their equivalent, in the scale frame 162. Each of the weight beams are provided with the usual weight-indicating graduations 170 and with slidable counter-weights 171 which may be locked in registry with any selected one of the graduations by means of knurled thumb screws 172. Detachable links 173 are provided on the weight beams 167 and 168 so that these latter weight beams may be releasably attached to the uppermost weight beam 166. An over-and-under dial 174 is provided on the scale frame 162 which has an indicator 176 operatively connected by a link 177, or by other such connecting means, with the scale bar 154.

The triple beam scale just described is provided for separately weighing the materials deposited in the skip 99 from the respective hoppers 24, 26 and 27. For instance, when it is desired to proportion a batch of material, the lower weight beams 167 and 168 are released from the upper weight beam 166 by releasing the detachable links 173. The desired weight of material forming the first ingredient of the batch is now registered on the weight beam 166 by properly setting the counterweight 171 thereof. The operator now manipulates the control lever 96 of the hopper 24 so as to open the gate 82 of the latter. Material, which in this case is crushed rock or gravel, will now flow from the hopper 24 into the skip 99. When the required amount of material has been deposited in the skip, which will be indicated by the indicator 176 of the over-and-under dial 174 registering with the balance index 178, the gate 82 is closed. The weight beam 167 is now connected with the upper weight beam 166 by means of the uppermost detachable link 173 and the desired weight of second ingredient of the batch is set thereon by properly locating its counterweight 171. The gate 82 of the hopper 26 is now opened allowing the sand contained therein to flow into the skip 99. As before, the deposition of the correct amount of sand in the skip will be indicated by registry of the indicator 176 with the index 178 after which the gate of the hopper 26 may be closed. The lowermost weight beam 168 is now connected with the weight beam 167 by the lower link 173 and the desired weight of cement is indicated on the beam 168 by setting its counterweight 171. The gate of the hopper 27 is now opened allowing cement to flow from the latter hopper into the skip 99. Again, indication of the correct weight of cement in the skip will be shown by the indicator 176 registering with its index 178 whereupon the gate of the hopper 27 may be closed. After the counterweights 171 have been once set, the separate ingredients of successive batches may be weighed by merely attaching or detaching the links 173.

Means is provided for moving the loaded skip 99 to an elevated position and there tilting the skip so that its load may be dumped into a conveying device or other receiver. Journaled in bearings 179, mounted at the junction of the frame members 117 and 121, is a transverse hoist shaft 181 provided, as is best shown in Figure 1, with a pair of drums 182, positioned within the frame, and a drive drum 183 positioned exteriorly of the frame on an extension of the hoist shaft. A drive cable 184, wound about the drum 183 extends rearwardly of the batcher and is also wound about a drum 186 carried by a shaft 187 mounted by bearings 188 on the platform 46. A chain drive 189 connects the shaft 187 to be driven by the jackshaft which, in turn, is driven by the motor shaft 47. A suitable disconnecting clutch, not shown but familiar to those skilled in the art, is provided in the drive connection of the shaft 187 as is also a brake so that the shaft 187 may be connected, when desired, to be driven by the motor 44 or so that rotation of the shaft may be controllably resisted when it is disconnected from the motor. Hoist cables 191, each having an end wound around and connected with the drums 182, extend downwardly, within the frame substantially paralleling the tracks 116 and 123, under guide rollers 192, which are journaled on stub shafts 193 supported by brackets 194 carried by lower ends of the rails 116 and 123, and are secured, by means of clevises 196 and pins 197 to slip connectors 198. Each of the slip connectors is provided with an elongated slot 199 in which a headed stud 201, carried by a V-shaped reinforcing bar 202 secured to the side of the skip and to the reinforcing bar 107 thereof, is slidably disposed. When the shaft 187 is connected to be driven by the motor 44, the cable 184 will be unwound from the drum 183 onto the drum 186 thereby rotating the hoist shaft 181 and causing the hoist cables 191 to be wound upon the drums 182. This will pull the skip 99 out from under the hoppers and upwardly along the rails 116 and 123; the forward wheels 124 following within the channel rails 123 and the rear wheels 104 riding along the top of the tracks 116. When the forward wheels 124 reach the stops 125 at the upper end of the channel rails 123 the forward movement of the skip will be arrested and further pull on the cables 191 will lift the skip, about a fulcrum coinciding with the axis of the wheels 124, into a tilted position, indicated by the dotted lines of Figure 3, so that the contents of the skip may flow from the open forward end thereof into a hopper 203 which is carried by the forward end of the frame bars 118 and is positioned above the loading aperture 204 of a receiver which may be, for example, a mixer truck 206 or a stationary mixer. After dumping, the hoisting clutch is released and the skip is allowed to descend, by gravity and under the restraint of the lowering brake, to its original position below the material hoppers where it may again be loaded as described above.

Since there may be more or less tension in the hoisting cables 191 which might interfere with correct weighing of the material being deposited in the skip 99, I provide means for slacking off on the cables when the skip is in its lower or loading position. On each of the slip connectors 198 I provide pins 207 which are positioned to be engaged by the hooked arms 208 of bell crank levers 209 carried by pivot pins 211 mounted on the lower frame bars 7. When the skip reaches its lower limit of travel, the operator moves the levers 290 thus engaging the arms 208 with the pins 207 and pulling the connectors 198 downwardly so that the pins 201 are positioned about midway of the length of the slots 199. This releases any tension in the cables 191 so that it will not be reflected in the indicated weights of the materials as they are discharged from the hoppers into the skip.

Having thus described my invention in detail, what I claim as new and desire to secure by Letters Patent is:

1. A batch charger comprising a carriage, hoppers on said carriage in which individual quantities of material may be stored, said hoppers each having therein a discharge port and provided with portions foldable to form a recess within the collective hoppers, a material elevator mounted on said carriage and having a considerable portion thereof extending above said hoppers, said elevator being movable on the carriage to bring the portion thereof extending above said hoppers into said recess, means for selectively directing material from said elevator into the respective hoppers, a scale, including a movable skip, for weighing and receiving material discharged from said hoppers through the discharge ports thereof, means for conveying said skip to an elevated position relative to said carriage, and means for dumping said material from the skip.

2. A batch charger comprising a carriage, hoppers on said carriage in which individual quantities of material may be stored, said hoppers each having therein a discharge port and provided with portions foldable to form a recess within the collective hoppers, a material elevator mounted on said carriage and having a considerable portion thereof extending above said hoppers, said elevator being movable on the carriage to bring the portion thereof extending above said hoppers into said recess, means for selectively directing material from said elevator into the respective hoppers, a scale, including movable skip rails and a skip supported thereon, for weighing and receiving material discharged from said hoppers through the discharge ports thereof, fixed skip rails extending toward an elevated position relative to said skip and alined with said movable skip rails, means for moving said skip from said movable skip rails onto and along said fixed skip rails, and means at said elevated position of the fixed skip rails for tilting said skip to dump said material therefrom.

3. A batch charger comprising a carriage, a plurality of hoppers on said carriage in which individual quantities of material may be stored, said hoppers each having therein a discharge port and having a recessed top portion, erectile plates in said recessed top portion of the hoppers for vertically extending the depth of the latter, a substantially vertically positioned material-elevating conveyor pivotally mounted on said carriage and having a considerable portion thereof movable from an erected position above said hoppers to a reclining position within said recessed top of the hoppers, means for selectively directing material from said conveyor into the respective hoppers, a scale positioned below said hoppers adjacent the discharge ports thereof, a skip carried on said scale and movable along tracks to an elevated position on said carriage, means for releasing material from said hoppers to enter said skip, and means operative at said elevated position of the skip for tilting the skip to dump said material therefrom.

4. A batch charger comprising a carriage, a frame rising vertically from said carriage, a plurality of individual hoppers on said frame in which quantities of material may be stored, each of said hoppers having a discharge port therein, means for opening and closing said hopper discharge ports for controlling discharge of said material from the hoppers, side plates rising from opposite upper edges of said hoppers to form a recess above said hoppers, flaps hingedly mounted on said side plates and movable to vertically erect positions for selectively increasing the vertical height of said side plates, transverse bulkhead plates hingedly mounted on said hoppers at upper edges thereof and movable from reclining positions forming the bottom of said recess to erected positions forming vertical extensions of transverse sides of the hoppers, a conveyor support frame pivotally mounted intermediate its ends on said carriage frame, an endless belt conveyor carried by said conveyor support frame, a bin mounted on said carriage frame and through which the lower portion of said belt conveyor passes for transporting material from said bin to an elevated position above said hoppers, the upper portion of said conveyor frame being receivable, when the conveyor frame is moved about its pivot, within said recess above the hoppers, means for driving said conveyor belt, means for selectively directing material elevated by said conveyor into the respective hoppers, means including a movable skip positioned below said hopper discharge ports for weighing and receiving individual quantities of material discharged from said hoppers, means for moving said skip to an elevated position on said carriage frame, and means for dumping said skip.

5. A batch charger comprising a carriage, a frame rising vertically from said carriage, a plurality of individual hoppers on said frame in which quantities of material may be stored, each of said hoppers having a discharge port therein, means for opening and closing said hopper discharge ports for controlling discharge of said material from the hoppers, side plates rising from opposite upper edges of said hoppers to form a recess above said hoppers, flaps hingedly mounted on said side plates and movable to vertically erect positions for selectively increasing the vertical height of said side plates, transverse bulkhead plates hingedly mounted on said hoppers at upper edges thereof and movable from reclining positions forming the bottom of said recess to erected positions forming vetrical extensions of transverse sides of the hoppers, a conveyor support frame pivotally mounted intermediate its ends on said carriage frame, an endless belt conveyor carried by said conveyor support frame, a bin mounted on said carriage frame and through which the lower portion of said belt conveyor passes for transporting material from said bin to an elevated position above said hoppers, the upper portion of said conveyor frame being receivable, when the conveyor frame is moved about its pivot, within said recess above the hoppers, means for driving said conveyor belt, a chute for receiving material discharged from said conveyor and extending across said plurality of hoppers, gates in said chute above said hoppers for selectively diverting said material from the chute into a selected one of said hoppers, means including a movable skip positioned below said hopper discharge ports for weighing and receiving individual quantities of material discharged from said hoppers, means for moving said skip to an elevated position on said carriage frame, and means for dumping said skip.

6. A batch charger comprising a carriage, a frame rising vertically from said carriage, a plurality of individual hoppers on said frame in which quantities of material may be stored, each of said hoppers having a discharge port therein, means for opening and closing said hopper discharge ports for controlling discharge of said material from the hoppers, side plates rising from opposite upper edges of said hoppers to form a recess above said hoppers, flaps hingedly mounted on said side plates and movable to vertically erect positions for selectively increasing the vertical height of said side plates, transverse bulkhead plates hingedly mounted on said hoppers at upper edges thereof and movable from reclining positions forming the bottom of said recess to erected positions forming vertical extensions of transverse sides of the hoppers, a conveyor support frame pivotally mounted intermediate its ends on said carriage frame, an endless belt conveyor carried by said conveyor support frame, a bin mounted on said carriage frame and through which the lower portion of said belt conveyor passes for transporting material from said bin to an elevated position above said hoppers, the upper portion of said conveyor frame being receivable, when the conveyor frame is moved about its pivot, within said recess above the hoppers, means for driving said conveyor belt, a chute for receiving material discharged from said conveyor and extending across said plurality of hoppers, a discharge opening in said chute, a gate mounted on said chute movable to simultaneously uncover said opening and to block said chute against the passage of material through the chute past said discharge opening so as to divert said material from the chute through the discharge opening into one of said hoppers, means including a movable skip positioned below said hopper discharge ports for weighing and receiving individual quantities of material discharged from said hoppers, means for moving said skip to an elevated position on said carriage frame, and means for dumping said skip.

7. A batch charger comprising a carriage, a frame rising vertically from said carriage, a plurality of individual hoppers on said frame in which quantities of material may be stored, each of said hoppers having a discharge port therein, means for opening and closing said hopper discharge ports for controlling discharge of said material from the hoppers, side plates rising from opposite upper edges of said hoppers to form a recess above said hoppers, flaps hingedly mounted on said side plates and movable to vertically erect positions for selectively increasing the vertical height of said side plates, transverse bulkhead plates hingedly mounted on said hoppers at upper edges thereof and movable from reclining positions forming the bottom of said recess to erected positions forming vertical extensions of transverse sides of the hoppers, a conveyor support frame pivotally mounted intermediate its ends on said carriage frame, an endless belt conveyor carried by said conveyor support frame, a bin mounted on said carriage frame and through which the lower portion of said belt conveyor passes for transporting material from said bin to an elevated position above said hoppers, the upper portion of said conveyor frame being receivable, when the conveyor frame is moved about its pivot, within said recess above the hoppers, means for driving said conveyor belt, a chute for receiving material discharged from said conveyor and extending across said plurality of hoppers, means on said chute for releasably mounting the chute on said bulkhead plates, gates in said chute above said hoppers for selectively directing said material from the chute into a selected one of said hoppers, means including a movable skip positioned below said hopper discharge ports for weighing and receiving individual quantities of material discharged from said hoppers, means for moving said skip to an elevated position on said carriage frame, and means for dumping said skip.

8. A batch charger comprising a carriage, a frame rising vertically from said carriage, a plurality of individual hoppers on said frame in which quantities of material may be stored, each of said hoppers having a discharge port therein, means for opening and closing said hopper discharge ports for controlling discharge of said material from the hoppers, side plates rising from opposite upper edges of said hoppers to form a recess above said hoppers, flaps hingedly mounted on said side plates and movable to vertically erect positions for selectively increasing the vertical height of said side plates, transverse bulkhead plates hingedly mounted on said hoppers at upper edges thereof and movable from reclining positions forming the bottom of said recess to erected positions forming vertical extensions of transverse sides of the hoppers, a conveyor support frame pivotally mounted intermediate its ends on said carriage frame, an endless belt conveyor carried by said conveyor support frame, a bin mounted on said carriage frame and through which the lower portion of said belt conveyor passes for transporting material from said bin to an elevated position above said hoppers, the upper portion of said conveyor frame being receivable, when the conveyor frame is moved about its pivot, within said recess above the hoppers, means for driving said conveyor belt, means for selectively directing material elevated by said conveyor into the respective hoppers, a scale on said carriage positioned below said hoppers and including a skip cradle, a skip, for receiving material discharged from said hoppers, movable onto and from said skip cradle, guide rails on said carriage frame along which said skip may be moved to an elevated position on said carriage frame, means for moving said skip along said guide rails, and means operative at said elevated position for tilting said skip to dump said material therefrom.

9. A batch charger comprising a carriage, a frame rising vertically from said carriage, a plurality of individual hoppers on said frame in which quantities of material may be stored, each of said hoppers having a discharge port therein, means for opening and closing said hopper discharge ports for controlling discharge of said material from the hoppers, side plates rising from opposite upper edges of said hoppers to form a recess above said hoppers, flaps hingedly mounted on said side plates and movable to vertically erect positions for selectively increasing the vertical height of said side plates, transverse bulkhead plates hingedly mounted on said hoppers at upper edges thereof and movable from reclining positions forming the bottom of said recess to erected positions forming vertical extensions of transverse sides of the hoppers, a conveyor support frame pivotally mounted intermediate its ends on said carriage frame, an endless belt conveyor carried by said conveyor support frame, a bin mounted on said carriage frame and through which the lower portion of said belt conveyor passes for transporting material from said bin to an elevated position above said hoppers, the upper portion of said conveyor frame being receivable, when the conveyor frame is moved about its pivot, within said recess above the hoppers, means for driving said conveyor belt, means for selectively directing material elevated by said conveyor into the respective hoppers, a scale on said carriage positioned below said hoppers and including a pair of parallel skip rails, a skip, for receiving material discharged from said hoppers, provided with wheels engaging said skip rails, continuation rails secured to said carriage frame and extending angularly upwardly thereon to an elevated position, powered means for moving said skip along said skip rails and said continuation rails to said elevated position, and means operative at said elevated position for tilting said skip to dump said material therefrom.

10. A batch charger comprising a carriage, a frame rising vertically from said carriage, a plurality of individual hoppers on said frame in which quantities of material may be stored, each of said hoppers having a discharge port therein, means for opening and closing said hopper discharge ports for controlling discharge of said material from the hoppers, side plates rising from opposite upper edges of said hoppers to form a recess above said hoppers, flaps hingedly mounted on said side plates and movable to vertically erect positions for selectively increasing the vertical height of said side plates, transverse bulkhead plates hingedly mounted on said hoppers at upper edges thereof and movable from reclining positions forming the bottom of said recess to erected positions forming vertical extensions of transverse sides of the hoppers, a conveyor support frame pivotally mounted intermediate its ends on said carriage frame, an endless belt conveyor carried by said conveyor support frame, a bin mounted on said carriage frame and through which the lower portion of said belt conveyor passes for transporting material from said bin to an elevated position above said hoppers, the upper portion of said conveyor frame being receivable, when the conveyor frame is moved about its pivot, within said recess above the hoppers, means for driving said conveyor belt, means for selectively directing material elevated by said conveyor into the respective hoppers, a scale on said carriage positioned below said hoppers and including a pair of parallel skip rails, a skip, for receiving material discharged from said hoppers, provided with wheels engaging said skip rails, continuation rails secured to said carriage frame and extending angularly upwardly thereon to an elevated position, a hoist shaft journaled on said carriage frame, drums on said hoist shaft, cables connecting said drums and said skip, and means for rotating said hoist shaft.

11. A batch charger comprising a carriage, hoppers on said carriage in which individual quantities of material may be stored, said hoppers each having therein a discharge port and provided with portions foldable to form a recess within the collective hoppers, a material elevator mounted on said carriage and having a considerable portion thereof extending above said hoppers, said elevator being movable on the carriage to bring the portion thereof extending above said hoppers into said recess, means for selectively directing material from said elevator into the respective hoppers, a scale, including a movable skip, for weighing and receiving material discharged from said hoppers through the discharge ports thereof, means including a connector slidable relative to and into hoisting engagement with said skip for conveying said skip to an elevated position on said carriage, means for dumping said material from said skip, and means on said carriage engageable with said skip connector for moving said connector out of hoisting engagement with said skip.

12. A batch charger comprising a carriage, hoppers on said carriage in which individual quantities of material may be stored, said hoppers each having therein a discharge port and provided with portions foldable to form a recess within the collective hoppers, a material elevator mounted on said carriage and having a considerable portion thereof extending above said hoppers, said elevator being movable on the carriage to bring the portion thereof extending above said hoppers into said recess, means for selectively directing material from said elevator into the respective hoppers, a scale, including a movable skip, for weighing and receiving material discharged from said hoppers through the discharge ports thereof, said skip having hoisting pins secured to and extending therefrom, a hoisting shaft journaled on said carriage having drums mounted thereon, means for rotating said hoisting shaft, cables secured to said drums extending toward and terminating adjacent said skip connectors carried by said cables engaged with and slidable relative to said skip hoisting pins, and means on said carriage engageable with said connectors for moving said connectors relative to said hoisting pins.

13. A batch charger comprising a carriage, hoppers on said carriage in which individual quantities of material may be stored, said hoppers each having therein a discharge port and provided with portions foldable to form a recess within the collective hoppers, a material elevator mounted on said carriage and having a considerable portion thereof extending above said hoppers, said elevator being movable on the carriage to bring the portion thereof extending above said hoppers into said recess, means for selectively directing material from said elevator into the respective hoppers, a scale, including a movable skip, for weighing and receiving material discharged from said hoppers through the discharge ports thereof, said skip having hoisting pins secured to and extending therefrom, a hoisting shaft journaled on said carriage having drums mounted thereon, means for rotating said hoisting shaft, cables secured to said drums extending toward and terminating adjacent said skip, connectors carried by said cables each having an elongated opening therein in which the hoisting pins of said skip are slidably engaged and each further having lugs extending therefrom, and levers mounted on said carriage and movable to engage said connector lugs for moving said connectors so as to position said skip hoisting pins substantially medially of said elongated openings of said connectors.

BERT NOBLE.